United States Patent [19]

Martin

[11] 4,439,828
[45] Mar. 27, 1984

[54] INSTRUCTION SUBSTITUTION MECHANISM IN AN INSTRUCTION HANDLING UNIT OF A DATA PROCESSING SYSTEM

[75] Inventor: Daniel B. Martin, Poughkeepsie, N.Y.

[73] Assignee: International Business Machines Corp., Armonk, N.Y.

[21] Appl. No.: 287,342

[22] Filed: Jul. 27, 1981

[51] Int. Cl.³ .............................................. G06F 9/16
[52] U.S. Cl. ............................................. 364/200
[58] Field of Search ... 364/200 MS File, 900 MS File

[56] References Cited

U.S. PATENT DOCUMENTS 3,345,615  10/1967  Peterson et al. ............... 364/900
4,155,120   5/1979  Keefer et al. ................... 364/200

Primary Examiner—Raulfe B. Zache
Attorney, Agent, or Firm—Robert W. Berray

[57] ABSTRACT

Buffered, pre-fetched instructions in the instruction handling portion of a data processing system are examined to detect sequences of predetermined instructions to effect generation of a substitute instruction to be executed by an execution unit in place of the first instruction of the sequence to perform the functions specified by all of the instructions of the sequence.

6 Claims, 7 Drawing Figures

INSTRUCTION SUBSTITUTION MECHANISM IN AN INSTRUCTION HANDLING UNIT OF A DATA PROCESSING SYSTEM

FIELD OF INVENTION

The invention relates to a data processing system and more particularly to the instruction handling unit in a high-performance data processing system.

BACKGROUND OF INVENTION

The instruction processing rate of a large, high-performance digital computer is generally achieved by designs which employ various means of instruction pre-fetch, decoding, and execution overlap. Many provide a maximum processing rate of one instruction per cycle, because only a single instruction can be decoded during a cycle. The maximum processing rate of large, general purpose digital computers can be affected by the ability to pre-fetch instructions. Pre-fetching means that instructions are fetched from a main storage system prior to the time they are required for processing. These instructions are held in a high-speed local store normally referred to as an instruction buffer. When needed, instructions are gated out of the instruction buffer, one at a time, into an instruction register for decoding and main store address generation. After decoding and address generation, the instruction is then gated into an operation register to be utilized by an execution unit during instruction processing.

An instruction buffer might have a capacity of up to four doublewords (one word equals 32 binary bits). If the high-performance data processing system is designed to operate with instructions having different lengths, such as defined in the IBM System/370 Principles of Operations, Form No. GA22-7000, an instruction buffer of four double words is capable of storing approximately 8 instructions.

Any stored program computer is designed to function with a predetermined number of previously defined program instructions which accomplish prespecified functions in the data processing system. Programs are written utilizing the instruction set. A programmer may desire that certain functions ultimately be accomplished, and he is required to create sequences of program instructions from the instruction set available to him. When the programs have been written, and particular functions are seen to occur frequently, it might be desirable to define a new program instruction which, through a single decoding operation would accomplish the desired overall function. However, data processing systems already designed and in use, would not be able to recognize the newly defined instruction, and therefore not gain performance improvement. Even if a new data processing system were designed to recognize a new instruction for accomplishing an overall function, the vast number of previously written programs dealing with system control or applications, would not benefit from the increased performance, and would have to be rewritten to utilize the newly defined instruction.

Instructions defined in the IBM System/370 Principles of Operation, include an 8-bit Op-Code field, and a number of other 4-bit fields which provide program addressable access to 16 general purpose registers (GPR's). The 16 GPR's can be programmed to temporarily store operand data, base address values, or address index values. The general register designated as a base address register or address index value is utilized during instruction decoding phases to generate, or calculate, main storage addresses. The address generation phase may include the addition of a base address value from a general register, an address index value from a general register, and a 12-bit displacement address value contained in the instruction.

In data processing systems which have been designed to provide instruction decoding and execution overlap, a performance degradation is realized when a first instruction, during execution, effects a change of the data stored in a general register which is to be utilized in a next instruction as address information. This is known as "address generate interlock", and is degrading because the instruction following the first cannot enter the instruction decode and address generate phase until the previous instruction has been executed.

SUMMARY OF THE INVENTION

The present invention improves the performance of a data processing system with instruction decode and execute overlap without change to the architecture, the instruction set, the operating systems, the compilers, or the vast inventory of running production programs. Certain pre-defined instruction sequences are detected, and a substitute instruction is generated to replace the first instruction of the sequence, causing the execution unit of the data processing system to respond to the single substitute instruction to perform all the functions called for by the original sequence of instructions.

An instruction counter accesses instructions from an instruction buffer for transfer to an instruction register to be decoded and address generation performed. A sequence detector examines the Op-code field of adjacent instructions in the instruction buffer, and various 4-bit fields of adjacent instructions, to determine the presence of particular predefined instruction sequences. Detection of a particular sequence generates a signal to a substitute instruction generator which is effective to modify the first instruction of the instruction sequence in the instruction buffer. The substitute instruction will be identified by a unique Op-code field which defines a "pseudo instruction", in that it is not found in the assigned Op-codes of the instruction set. In a data processing system which has an execution unit controlled by microprogramming in a control store, the execution of the pseudo instruction can be effected by storing suitable microcode in the control store for access by the Op-code of the pseudo instruction to control all of the functions required of the execution unit to realize the results of all of the functions called for by the original sequence.

DETAILED DESCRIPTION OF INVENTION

Figure 1:
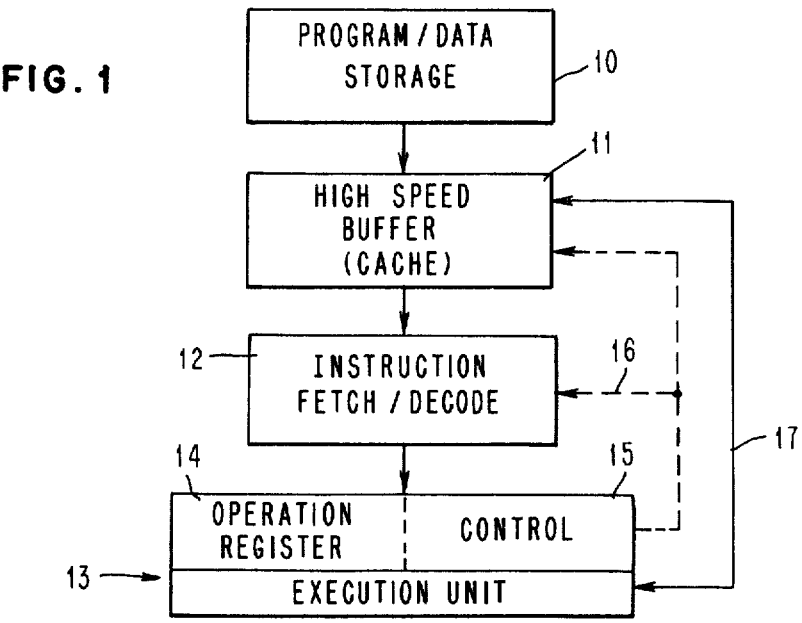
FIG. 1 is a block diagram of the primary functional units of a data processing system.

FIG. 1 is a block diagram of the major units of a typical high-performance data processing system. These include a main storage system comprised of a Program and Data Storage 10, which may cooperate with a High-Speed Buffer or Cache 11, to provide high-speed access to data or instructions previously fetched from the Program and Data Storage 10. An Instruction Fetch and Decode Unit 12 will be effective to pre-fetch and buffer a plurality of program instructions to be decoded in turn, with any necessary main storage address generation, for presentation to an Execution Unit 13. The Execution Unit 13 will include an Operation Register 14 for storing each instruction to be executed. A Control 15, as part of the Execution Unit 13, will respond to the Op-code field of an instruction in the Operation Register 14 to effect execution of the function called for by the instruction. Control signals 16 will be generated to control all of the units of the system. Data or operands will be transferred between the Execution Unit 13 and the main storage system on a bus 17. Commonly assigned U.S. Pat. No. 4,200,927 entitled "Multi-Instruction Stream Branch Processing Mechanism" by J. F. Hughes et al and issued Apr. 29, 1980, provides more detail of a high-performance data processing system such as outlined in FIG. 1. This patent describes an Execution Unit 13 that includes a microprogram controlled control store which responds to the Op-code field of an instruction to be executed to address a micro-program for executing the instruction. The only modification to the execution unit of the system shown in U.S. Pat. No. 4,200,927 for practicing the present invention, will be to store in the microprogram control store the necessary microinstructions for responding to otherwise unassigned System/370 Op-codes generated by the present invention.

Figure 2:
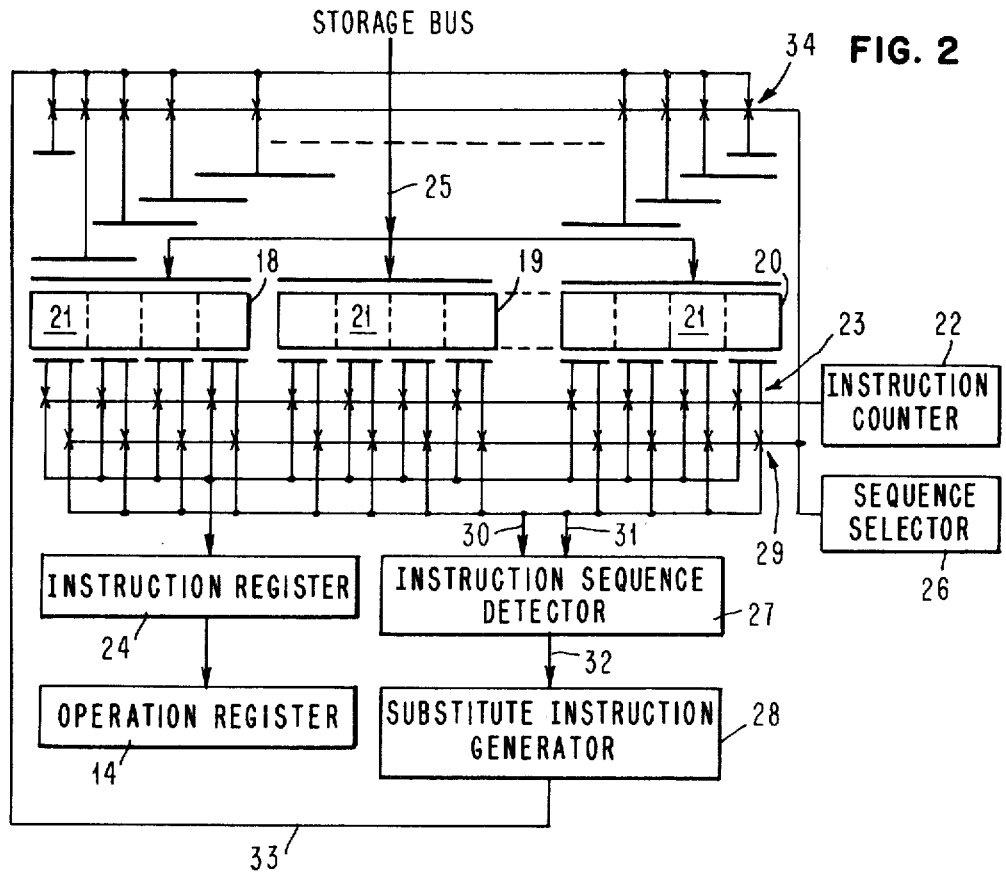
FIG. 2 is a block diagram of an instruction sequence detector and substitute instruction generator of the present invention connected to existing instruction buffer apparatus of a data processing system.
Figure 3:
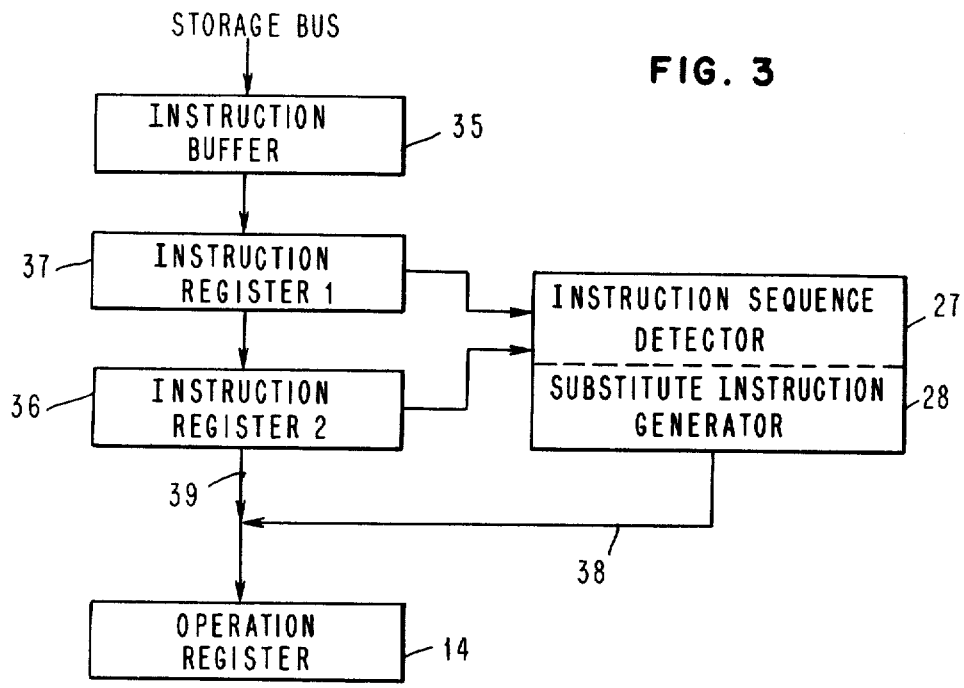
FIG. 3 is a block diagram of an instruction sequence detector and substitute instruction generator of the present invention connected to another form of instruction buffering in a data processing system.
Figure 4:
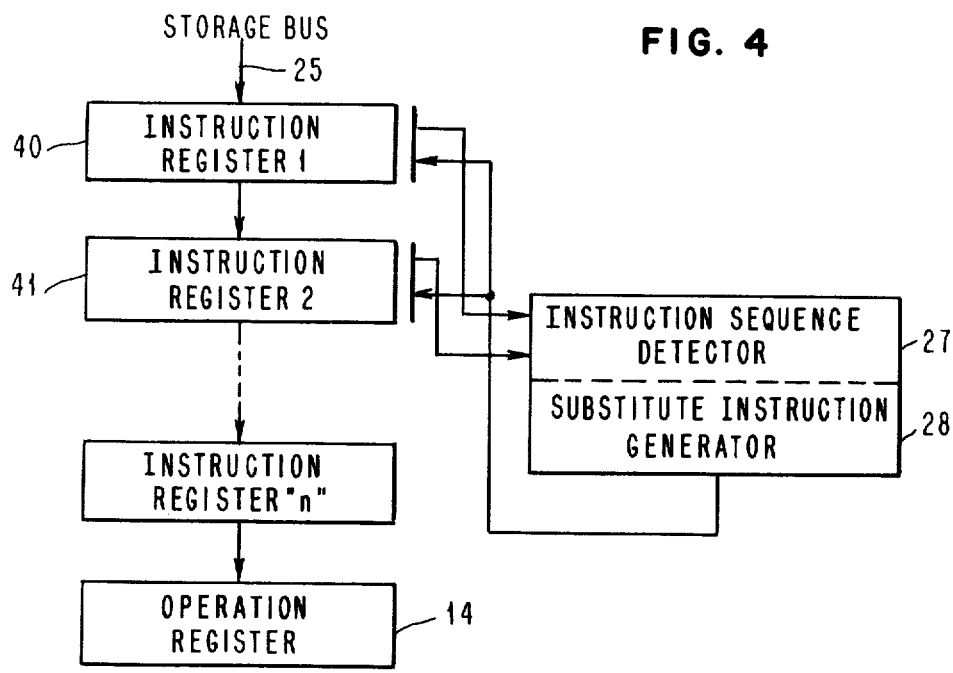
FIG. 4 is a block diagram of an instruction sequence detector and substitute instruction generator of the present invention connected to another form of instruction buffering mechanism of a data processing system.

FIGS. 2, 3, and 4 are representative of three types of instruction buffering that might be implemented in a high-performance data processing system where pre-fetching of instructions into an instruction buffer are effected by an Instruction Fetch, and Decode mechanism 12 depicted in FIG. 1.

The block diagram of FIG. 2 is similar to the instruction buffering described in the above cited U.S. Pat. No. 4,200,927. The instruction buffer is comprised of one or more doubleword registers shown at 18, 19, and 20. Each of the double word registers, 18, 19, and 20 is comprised of four halfword sections 21. Instructions defined for IBM System/370 may be 1, 2, or 3 halfwords long, and each 8-bit Op-code field must be on a halfword boundary. In FIG. 2, an Instruction Counter 22 sequentially enables a series of gates, noted generally at 23, in accordance with the requirements for gating a next instruction to an Instruction Register 24 for instruction decoding and address generation within the Instruction Fetch and Decode unit 12 shown in FIG. 1. The Operation Register 14 receives instructions from the Instruction Register 14 during execution of instructions in the Execution Unit 13 of FIG. 1.

With instruction execution and decode overlap, the instruction being executed will be stored in the Operation Register 14, the Instruction Register 24 will store the next subsequent instruction for the instruction decode and address generation phase, and the Instruction Counter 22 will be incremented in accordance with the length of the instruction in the Instruction Register 24, to prepare for the gating of the next instruction from the proper halfword section 21 of the instruction buffer registers 18, 19, or 20. As instructions are transferred from, and empty, the instruction buffer registers 18, 19, or 20, the Instruction Fetch and Decode unit 12 of FIG. 1 will be effective to initiate access to the main storage system for transfer of doublewords of instruction information on a Storage Bus 25 to replenish instruction buffer registers 18, 19, or 20.

The present invention, added to the previously described existing instruction buffering arrangement of FIG. 2, is represented by a Sequence Selecter 26, an Instruction Sequence Detector 27, and a Substitute Instruction Generator 28.

Coordinated with the transfer of double words on Storage Bus 25 into the instruction buffer registers 18, 19, or 20, and transfer of instructions to the Instruction Register 24 in accordance with the sequencing of the Instruction Counter 22, the Sequence Selector 26 will sequentially enable a set of gates, noted generally at 29, to transfer at least the Op-code field of two adjacent instructions on lines 30 and 31 to the Instruction Sequence Detector 27. The Instruction Sequence Detector 27 will examine at least the Op-code field of adjacent instructions, and provide an output signal 32 to the Substitute Instruction Generator 28 upon detection of a sequence of predetermined instructions. The Substitute Instruction Generator 28 will transfer at least the Op-code of a substitute instruction on line 33 to the proper location of instruction buffer registers 18, 19, or 20, through gates noted generally at 34, under control of the Sequence Selector 26. The substitute instruction takes the place of the first instruction of the sequence detected by the Instruction Sequence Detector 27.

As instructions are executed from the Operation Register 14, and decoded in Instruction Register 24, the Instruction Counter 22 will eventually gate the substitute instruction from its location in the instruction buffer to the Instruction Register 24 and ultimately to the Operation Register 14. Execution of the substitute instruction in the Operation Register 14, by the proper microprogram accessed from the Control 15 of the Execution Unit 13 shown in FIG. 1, will be effective to perform all of the functions called for by the sequence of instructions detected by the Instruction Sequence Detector 27.

Another form of instruction buffering is shown in FIG. 3. The arrangement of FIG. 3 includes a Storage Bus 25 and may include an Instruction Buffer 35 configured much like that shown in FIG. 2. The complex gating arrangement shown in FIG. 2 could allow an Instruction Sequence Detector 27 capable of examining 2, 3, or more instructions in a sequence. FIG. 3 is a simplified, but limited sequence detection mechanism, which would operate on two-staged instructions in Instruction Registers 36 and 37. The Instruction Sequence Detector 27 and Substitute Instruction Generator 28 would only examine the contents of the Instruction Registers 36 and 37. When the two-instruction sequence is detected, the instruction transferred to the Operation Register 14 would be transferred on path 38. The output 38 would also be used to cause the contents of Instruction Registers 36 and 37 to be cleared. In the absence of detection of the predefined sequence, the Operation Register 14 would receive the contents of Instruction Register 36 on path 39.

The two-staged Instruction Registers 36 and 37 shown in FIG. 3 may be generalized into "n" instruction registers, which would be manipulated as a stack, and replace the Instruction Buffer 35. FIG. 4 shows this structure in which the Instruction Sequence Detector 27 and Substitute Instruction Generator 28 are shown to be responsive to and affect the Instruction Registers 40 and 41. Transferring a substitute instruction to Instruction Register 41 would also be effective to clear Instruction Register 40. Also, more than two instructions could be examined with this generalized arrangement.

The present invention is general in nature, and is illustrated with specific examples. The IBM System/370 instruction pair Load, Load and Test Register (L,LTR) where only one general purpose register is involved, are represented as follows:

L 5,VALUE 3

LTR 5,5

This instruction pair usually precedes a branch instruction. It is the programmer's intention to test, and branch on, the sign of a data item. The Load instruction, which address main storage with an address represented as "Value 3", does not set the condition code. There is no "Load and Test" RX-format instruction. The L, LTR sequence performs that function.

For purpose of explanation, assume that an instruction buffer contains this instruction sequence:

| #1 | L | 4,VALUE1 |
| #2 | A | 4,VALUE2 |
| #3 | ST | 4,SUM |
| #4 | L | 5,VALUE3 |
| #5 | LTR | 5,5 |
| #6 | BZ | TARGET |

These instructions have been given labels #1 through #6 for ease of reference. This instruction sequence uses instruction mnemonics (e.g. ST=STORE) and symbolic main storage address locations (e.g. SUM), as written by the programmer. The image of these instructions in storage is composed of hexadecimal digits, referring to the Op-codes and location of operands. In hexadecimal notation, the instruction sequence might look like this:

| #1 | 5840A124 |
| #2 | 5A40A2D4 |
| #3 | 5040A138 |

-continued

| #4 | 5850A8CC |
| #5 | 1255 |
| #6 | 4780A0F0 |

These instructions appear in storage in linear fashion:

...
5840A1245A40A2D45040A1385850A8CC125547-
80A0F0...

According to the IBM System/370 architecture, all instructions with Op-codes between hexadecimal 00 and 3F inclusive are 2 bytes long; all instructions with Op-codes between hexadecimal 40 and 7F inclusive are 4 bytes long; all instructions with Op-codes between hexadecimal 80 and FF inclusive are 6 bytes long. When instruction #1 is executing, its location is known. The contents of the instruction buffer can be broken down into individual instruction images. These are indicated below by underlining the first hexadecimal digit of each Op-code.

...
5840A1245A40A2D45040A1385850A8CC125547-
80A0F0...

While the execution unit is executing #1, the Instruction Sequence Detector 27 searches all following instructions contained in the instruction buffer. It searches for a sequence of predetermined instruction pairs such as L, LTR. When that instruction pair is encountered, it is also necessary to determine whether the general purpose register (GPR) specified as R1 in the Load instruction is the same one specified as R1 and R2 in the Load and Test Register instruction. These tests may be performed simultaneously. When both tests are satisfied, the substitute instruction "Load and Test" (LT) having a pseudo Op-code is substituted in the instruction buffer for the L, LTR pair.

Substitution can be done in several ways:

Substitution method 1. Replace the L with a pseudo Op-code LT of length 4 bytes, and replace the LTR with a two byte no-op, such as BCR 0,0.

Substitution method 2. Replace the L with a pseudo Op-code LT of length 6 bytes.

Substitution method 3. Replace the L with a pseudo Op-code LT of length 4 bytes, and delete the LTR instruction, manipulating the contents of the instruction buffer to "close ranks" around the gap.

The choice of method is left to the engineer who does the detailed hardware design. Method 2 has simplicity, covers most cases, and suggests a low cost in terms of circuit complexity. Method 2 will be described.

The hexadecimal representation of the instruction stream is shown below, with a symbolic mask below it. The portion of the mask which is composed of numerics indicates that a comparison is made between the instruction image and the mask. The portion of the mask which is composed of equal signs (=) indicates that the value of the indicated hex digits is unimportant; the test is to determine if they are all the same digit. Diagrammatically, the process proceeds in this manner:

...5840A1245A40A2D45040A1385850A8CC12554780A0F0...
    58=      12==
    (no match)

-continued

```
...5840A1245A40A2D45040A1385850A8CC12554780A0F0...
         58=       12==
              (no match)

...5840A1245A40A2D45040A1385850A8CC12554780A0F0...
         58=       12==
              MATCH!
```

Having found a match, the Substitute Instruction Generator 28 replaces the instruction sequence L, LTR with a pseudo Op-code Load and Test (LT). Assume that the Op-code "C8" will be assigned to substitute instruction LT.

Before substitution:

```
...
5840A1245A40A2D45040A138 5850A8CC125547-
80A0F0...
```

After substitution:

```
...
5840A1245A40A2D45040A138 C8-
50A8CC12554780A0F0...
```

Figure 5:
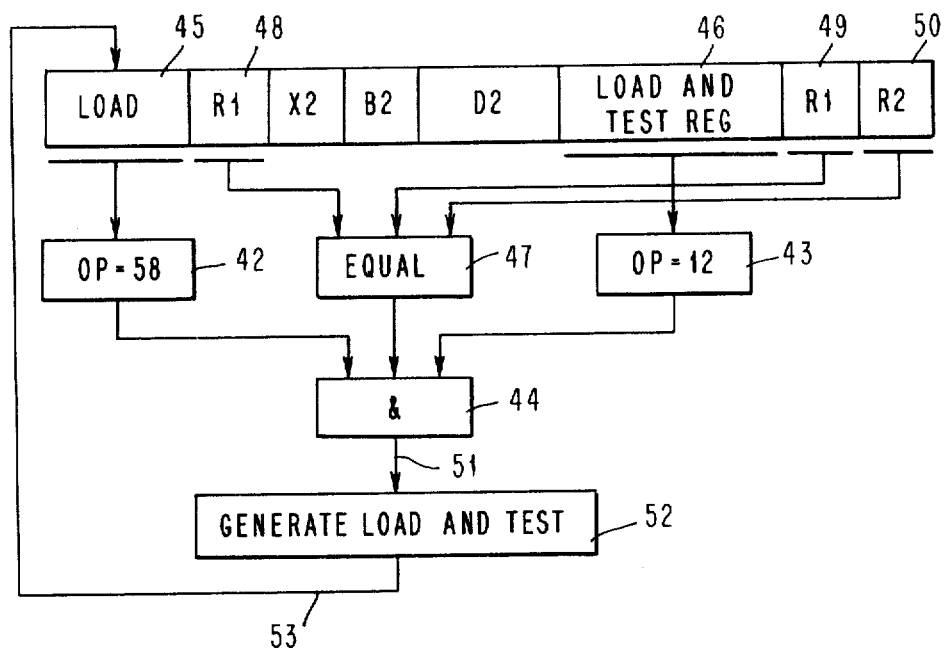
FIG. 5 is a block diagram of instruction field examining logic found in an instruction sequence detector of the present invention for signalling the existence of a predetermined sequence of instructions to cause generation of a load and test substitute instruction.

FIG. 5 is a logic representation of the requirements for creating the substitute instruction Load and Test (LT). The examining means of the Instruction Sequence Detector 27 includes an Op-code mask 42 and an Op-code mask 43 which produce output signals to an AND circuit 44 when the Op-code field 45 of a first instruction has a hexadecimal value of 58 (Load), and the Op-code field 46 of a second instruction has a hexadecimal value of 12 (Load and Test Register). A final determination to be made in this particular situation is by Equal logic 47 which determines that the general register address field 48 of the first instruction, and the general register address fields 49 and 50 of the second instruction are all equal. In this case, the AND circuit 44 will produce an output signal 51 indicating detection of the predetermined instruction sequence being sought. The output signal 51 will be effective at Generate Load and Test 52 to transfer a pseudo Op-code C8 on line 53 to the Op-code field 45 of the first instruction. When the pseudo Op-code C8 is decoded for execution, it will be detected as being three half-words in length. The Instruction Counter 22 of FIG. 1 will be stepped by three halfwords, skipping past the location of the second instruction Load and Test Register originally stored in the instruction buffers.

The microprogrammed Control 15 of the Execution Unit 13 of FIG. 1 will have been suitably programmed and the pseudo Op-code C8 will be effective to access this microprogram. The microprogram will access main storage for the operand addressed by the original Load instruction, store it in general register 5, sample the sign, and set the condition code. The last two steps were originally performed by the Load and Test Register instruction.

There is a significant advantage to the present invention which is not shared by the various instruction overlap schemes. The performance achieved by overlap schemes is degraded by the occurrence of the Address Generate Interlock (AGI). An AGI is said to occur when the general register which is modified by an instruction is used as an index or base register by the following instruction. The present invention is not handicapped by AGI. It is noted that an instruction overlap scheme and the present invention are not antagonistic, and can be employed in the same processor.

A typical example of the AGI problem is this instruction pair:

11 L 5,4(2,9) PICK UP ADDRESS OF ARGUMENT

12 L 5,0(0,5) PICK UP VALUE OF ARGUMENT

These two instructions are called a "Load-Using" pair. This is because #11 loads general register 5, and #12 uses general register 5 for calculating an effective address. The effective address is the sum of the displacement field of the instruction (D2), the contents of the index register (X2) provided that X2 is not register 0, and the contents of the base register (B2) provided that B2 is not register 0. This summation is performed by a three input adder in the central processor. In a processor which employs overlapped instruction execution, an instruction pair such as #11 and #12 will be subject to an AGI delay. General register 5 must be valid before the adder can perform the address computation for instruction #12. With the values shown for instructions #11 and #12, the effective address will turn out to be identical to the word fetched by the Load instruction #11 because the D2 and X2 fields of instruction #12 are both zero. The general registers used for a base address (without modification by X2 or D2) in the second load instruction is the same general register to be loaded by the first Load instruction. The Instruction Sequence Detector 27 can recognize this case and use it to advantage. The instruction pair #11 and #12 (L,L) is replaced by a substitute instruction pseudo Op-code "Load Indirect". This pseudo Op-code will access a microprogram from the Control 15 of Execution Unit 13 to control the High Speed Buffer 11 of FIG. 1 to do a double fetch. That is take the first fetched word addressed by the first Load instruction and use it immediately as the address of the second fetch called for by the second Load instruction.

Figure 6:
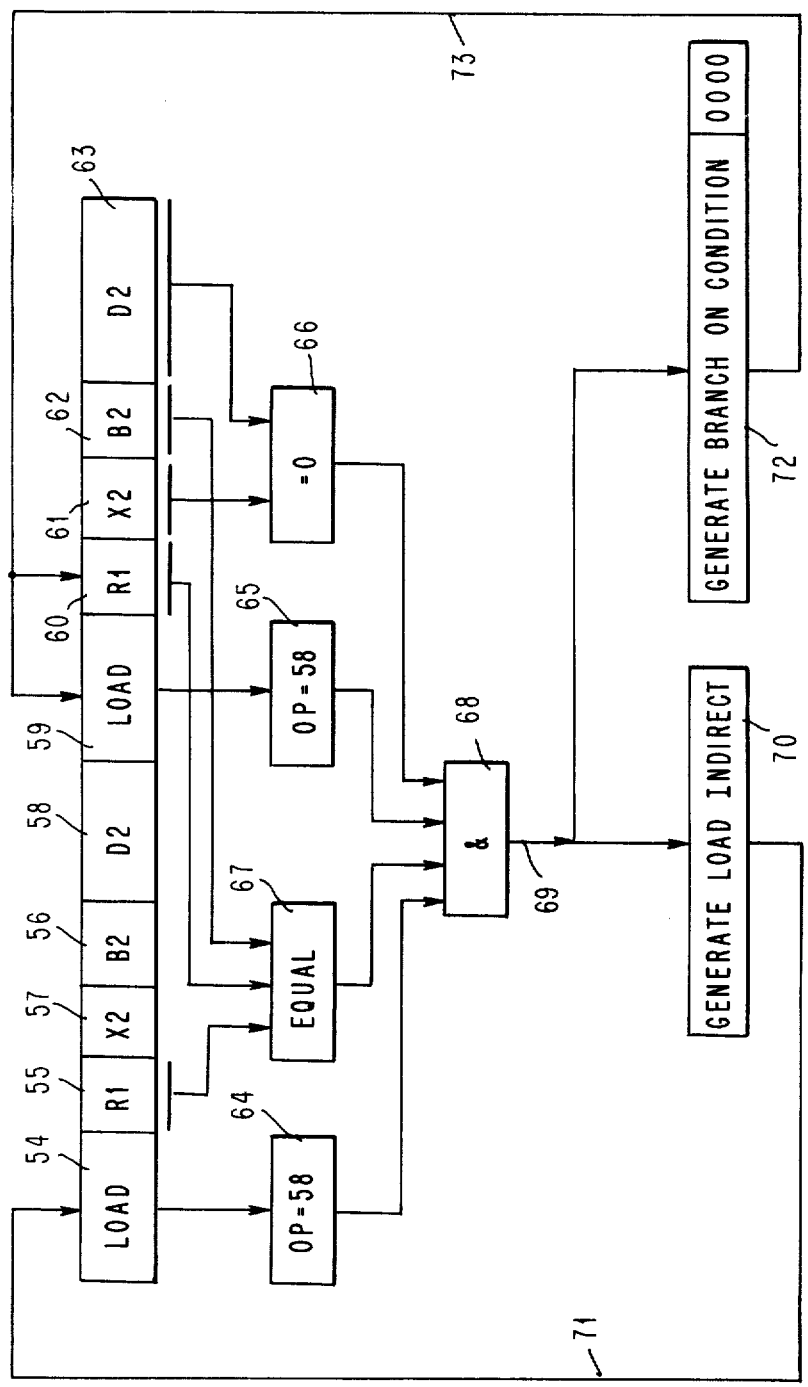
FIG. 6 is a block diagram of instruction field examining logic in an instruction sequence detector of the present invention for indicating a predetermined sequence of instructions to cause generation of a load indirect substitute instruction.

FIG. 6 shows the logic of the functions just described for creating a substitute instruction having a pseudo Op-code indicating a "Load Indirect" instruction. The Op-code field 54 indicates a Load instruction calling for the general register identified by the general register addressing field 55 to receive an operand from a main store address. The main store address is generated using the contents of a base address register identified by the general register address field 56, to which is added the contents of an address index value stored in a general register identified by the general register address field 57, and to which is added the binary value of the displacement address field 58. The Op-code field 59 of a second Load instruction indicates that the general register identified by the general register address field 60 will be loaded with data from main storage at an address generated using the contents of general registers identified by the general register address fields 61 and 62 to which is added the binary value of the displacement field 63.

The examining logic of the Instruction Sequence Detector 27 includes Op-code masks 64 and 65 for detecting first and second Load instructions in a sequence. Another condition for detecting the "Load Indirect" sequence is provided by zero detection logic 66 which will determine that the address generation phase for the second Load instruction only requires the contents of a base address register identified by the general register address field 62. The final condition is to determine that the general registers identified by fields 55, 60 and 62 are equal and is provided by the Equal logic 67. When all of these conditions are met, AND circuit 68 provides an output signal 69 indicating detection of a predetermined sequence of instructions. Output signal 69 will be effective at Generate Load Indirect 70 to transfer a pseudo Op-code on line 71 to Op-code field 54 creating a substitute Load Indirect instruction. The pseudo Op-code for Load Indirect is transferred to the Op-code field 54 of the first Load instruction.

The IBM System/370 instruction formats do not include an Op-code that designates a 4 halfword instruction format. Therefore, the pseudo Op-code of the Load Indirect substitute instruction will be coded to indicate a 2 halfword instruction such that the instruction counter will be incremented by 2 halfwords to access the Op-code field 59 of the second Load instruction. To prevent execution of the second Load instruction, the Substitute Instruction Generator 28 will also include Generate Branch on Condition means 72, responsive to the signal 69, to transfer on line 73, a substitute instruction for the second Load instruction. The desired result is to indicate a "no-op" which causes no functions to be performed by the execution unit. The IBM System/370 Branch on Condition instruction with a mask of hexadecimal 00 (all 0's) is interpreted by all System/370 processors as a no operation instruction. This is the instruction that is substituted for the second Load instruction.

Consider another instruction pair:

21 L 5,6(7,8) PICK UP ADDRESS OF TARGET

22 BCR F,5 UNCONDITIONAL BRANCH TO TARGET

This instruction pair resembles the pair #11, #12. This pair would also be subject to the AGI delay. Even though instruction #22, a Branch on Condition Register, does not perform an address computation, it cannot send a fetch request to the High Speed Buffer 11 of FIG. 1 until general register 5 becomes valid. Since the mask is "F" (all 1's) the branch is always taken. An instruction fetch will be made to the address fetched by the Load instruction #21, regardless of the condition code. This is a variation on the previously described indirect addressing. The Instruction Sequence Detector 27 recognizes this case and replaces the instruction pair #21 and #22 with a "Load and Branch" pseudo Op-code. That is, the data accessed by the first Load instruction is immediately used as a main storage address for access to the new instruction, and is stored in the Instruction Counter 22 of FIG. 1.

Figure 7:
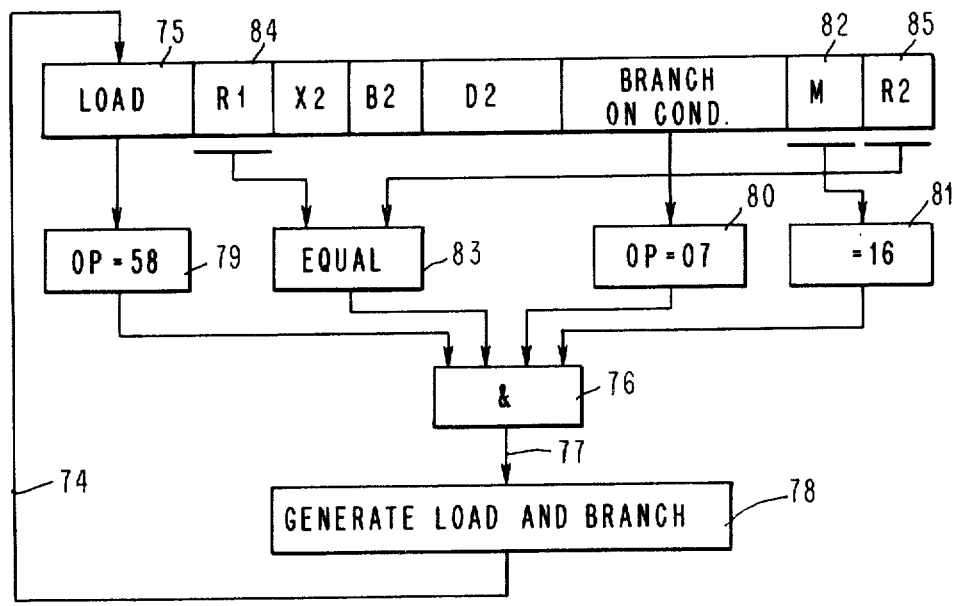
FIG. 7 is a block diagram of instruction field examining logic in an instruction sequence detector of the present invention for indicating the existence of a further predetermined sequence of instructions to cause generation of a load and branch substitute instruction.

FIG. 7 depicts the logic of the Instruction Sequence Detector 27 and indicates the fields examined to detect the predetermined sequence of instructions giving rise to generation of a pseudo Op-code indicating a Load and Branch substitute instruction, which is transferred on line 74 to the Op-code field 75 of the first Load instruction in this sequence. AND circuit 76 provides an output signal 77 to enable the Generate Load and Branch 78. Inputs to AND circuit 76 are from Op-code masks 79 and 80, (all 1's) mask logic 81 indicating that the Branch-on Condition instruction has a condition code mask field 82 of hexadecimal F, and an output from Equal logic 83 indicating that the general register address fields 84 and 85 are equal.

Three sequences of predetermined instructions found to occur frequently in previously written programs of instructions have been noted, and logic described to detect the sequences in an instruction buffer mechanism. An output signal generated on the occurrence of any of the three sequences generates a substitute instruction for the first instruction of the sequence to initiate execution of a single instruction that takes the place of functions previously accomplished over the instruction sequence. There could well be other observable sequences of instructions, found to occur frequently, that would give rise to implementing logic for the instruction sequence examining logic to prompt creation of other substitute instructions for that sequence. Further, it may be possible to observe sequences of more than two instructions that would give rise to creating the necessary logic for an instruction sequence examining mechanism to create a single substitute instruction to accomplish all of the functions effected by the original sequence.

Although this invention has been shown and described with respect to plural embodiments thereof, it should be understood by those skilled in the art that various changes and omissions in the form and details of the invention may be made therein without departing from the spirit and the scope of the invention.

Having thus described my invention, what I claim as new and desire to secure by Letters Patent is:

1. An instruction handling unit in a data processing system including a central processor instruction buffer for storing a plurality of program instructions, an execution unit for receiving instructions in sequence from the instruction handling unit for execution by the execution unit, and an addressable main storage system for storing data and instructions, the improvement comprising:
  instruction sequence detector means, connected to the instruction buffer, including examining means for fields of each of n sequential instructions in the instruction buffer;
  signalling means, connected and responsive to said examining means, for providing an output signal indicating a sequence of predetermined instructions in said n sequential instructions; and
  substitute instruction generator means, connected and responsive to said output signal of said signalling means for effecting transfer of a substitute instruction to the execution unit in place of said sequence of n predetermined instructions.

2. An instruction handling unit in accordance with claim 1 wherein:

n=2.

3. An instruction handling unit in accordance with claim 2 wherein said examining means includes:
  means connected to the Op-code field of two adjacent instructions in the instruction buffer.

4. An instruction handling unit in accordance with claim 3 wherein instructions stored in the instruction buffer include, in addition to an Op-code field, general register addressing fields, and a main storage addressing field, and wherein said examining means further includes:
  means connected to general register addressing fields of two adjacent instructions in the instruction buffer.

5. An instruction handling unit in accordance with claim 4 wherein:

said examining means includes;

load recognition means, connected to the Op-code field of the first of said two adjacent instructions, for indicating an instruction effective to transfer data from an addressed main storage location to a specified one of the general registers;

equality recognition means, connected and responsive to the general register addressing field of said first instruction, identifying said specified one of the general registers, and connected and responsive to at least one general register addressing field of the second of said two adjacent instructions for providing an equality signal indicating a two-instruction sequence in which said specified one of the general registers is loaded with data from an addressable main storage address by said first instruction, and is utilized during execution of said second instruction; and Op-code identifying means, connected and responsive to the Op-code field of said second instruction to provide one of a plurality of Op-code identifying signals;

said signalling means includes;

means connected and responsive to said load recognition means, said equality recognition means, and said Op-code identifying means, for providing one of a plurality of output signals associated with one of a plurality of predetermined sequences of said first and said second instructions; and said substitute instruction generator means includes;

means, responsive to each of said plurality of output signals from said signalling means, for effecting transfer of a unique substitute instruction for each of said plurality of predetermined sequences of said first and said second instructions as a substitute for said first instruction.

6. An instruction handling unit in accordance with claim 5 wherein one of said unique substitute instructions includes:

a pseudo Op-code field coded to enable execution control means in the execution unit for initiating a first and second access to the main storage system using first and second main storage addresses, said first main storage address specified by said first instruction, and said second main storage address being specified by the data accessed by said first main storage address.

* * * * *